United States Patent Office 2,738,236
Patented Mar. 13, 1956

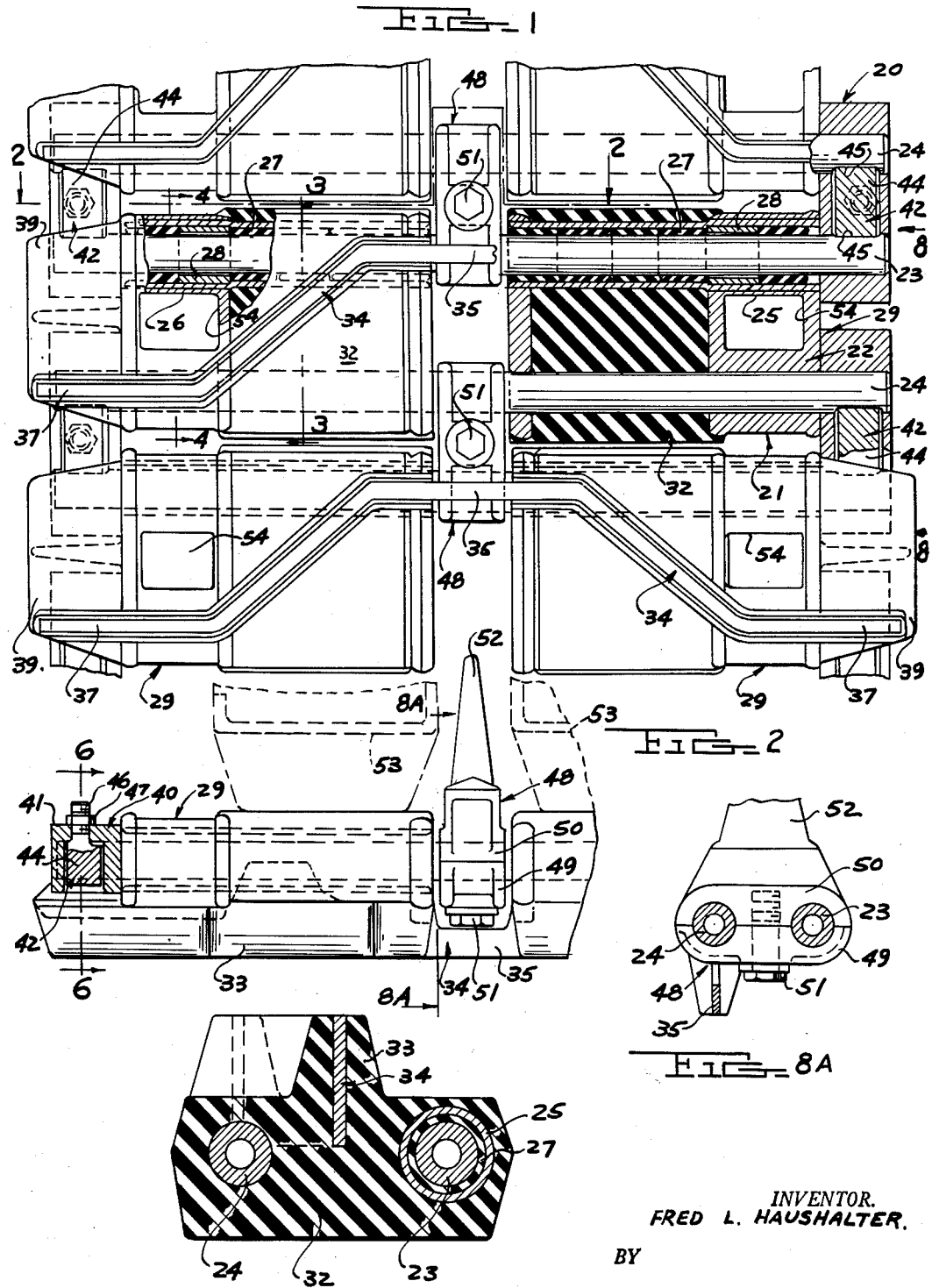

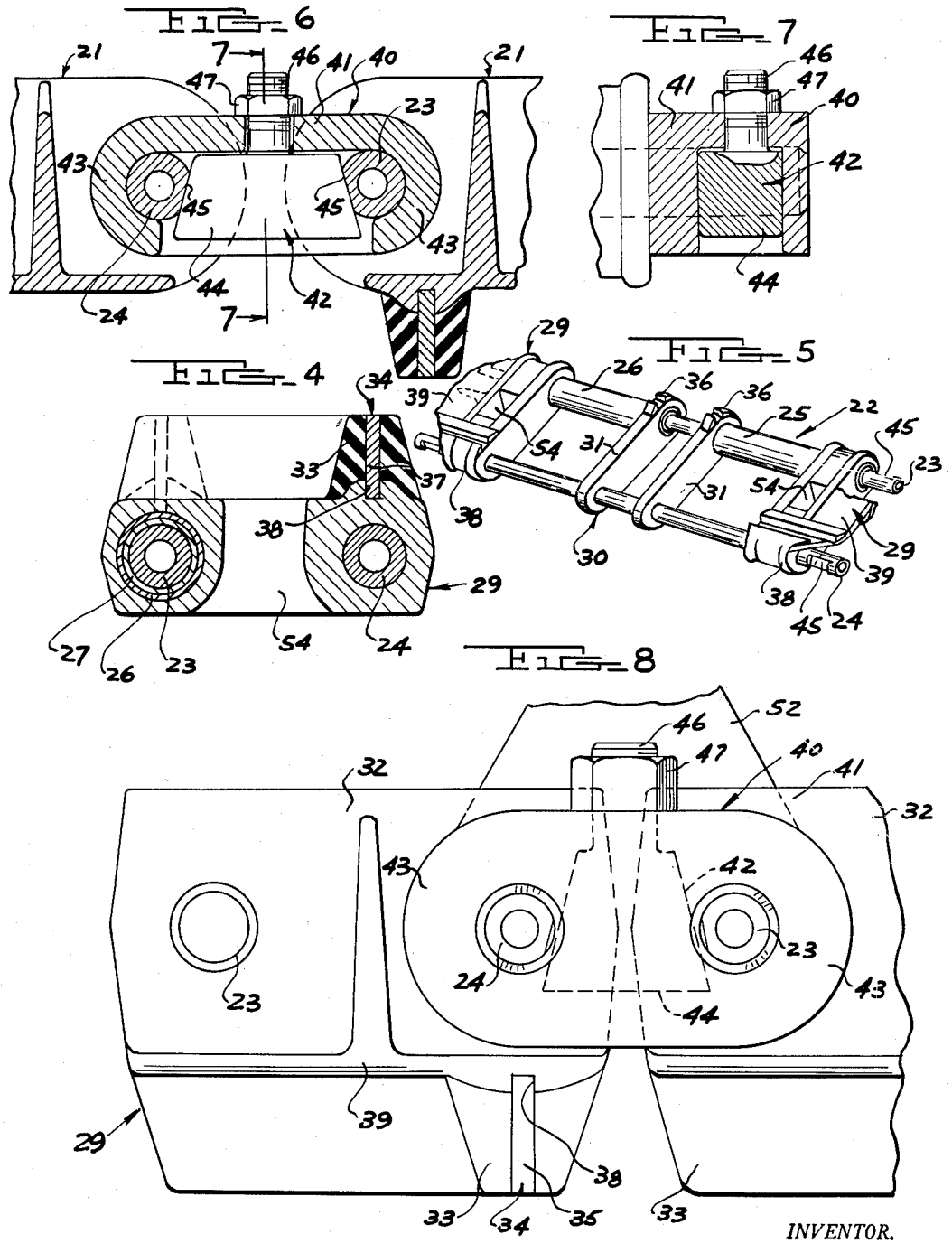

2,738,236

TRACK CONSTRUCTION

Fred L. Haushalter, Pontiac, Mich.

Application July 23, 1951, Serial No. 238,165

6 Claims. (Cl. 305—10)

This invention relates to endless tracks of the type commonly used on track laying vehicles, such for example, as tanks.

It is one of the objects of this invention to provide an endless track composed of a plurality of pivotally interconnected sections of the fabricated type constructed to substantially increase the rigidity of the track while at the same time, reducing the stretch and overall weight of the track. In accordance with this invention each track section has a rigid frame comprising laterally spaced substantially parallel pins, a sleeve for one pin, and members respectively connecting opposite end portions of the sleeve to the other pin. Suitable bushings of flexible material are held under compression between the sleeve and associated pin permitting limited rotative movement of the pin relative to the sleeve. Thus each track section has only a single bushed pin, as distinguished from the usual track section, which has two rubber bushed pins; and as a consequence, the extent of stretch of the track during use is reduced as much as fifty per cent. This is especially important in combat vehicles where it is not always possible to adjust the track during use, and where throwing of a track in combat oftentimes is disastrous to both personnel and equipment.

Moreover, the sum of the wall thickness of the rubber bushings employed in a track composed of sections having double rubber bushed pins must be greater than the wall thickness of the rubber bushings provided in a track section of the single bushed pin type in order to provide the degree of twist required to enable the track sections to pass around the drive sprocket. Tracks with double rubber bushed pins therefore increase the tendency to bow-out laterally when the vehicle is turned on a short radius; and in some instances, the extent of the lateral bowing of the track may be sufficient to cause the bogie wheels to climb over the track guides. Hence the provision of a track wherein each section has but one bushed pin materially increases the lateral stiffness of the track, and minimizes the tendency for the track to become disengaged in use.

Another condition where excessive track stretch may cause a vehicle to throw a track is when a vehicle with rear drive sprockets suddenly decreases its speed and turns sharply at the same time. At such an instant the accumulated stretch in the rubber bushings, due to the driving effort to propel the vehicle, suddenly produces a slack section of track at the rear sprocket which flies off the sprocket as the vehicle turns, since the track is beyond the sprocket teeth. The longer the track, the more slack is accumulated at the rear sprockets; hence, if forty to fifty per cent of the track stretch can be eliminated, the more difficult it is to throw tracks when braking and turning are done at the same time.

It is another object of this invention to supplement the flexible bushings with one or more metal bushings in a manner such that the metal bushing or bushings act as a support after a predetermined amount of radial deflection of the flexible bushings has been exceeded. Thus displacement of the pins during times of high drawbar pull of the vehicle is materially reduced, and the effect of such reduced displacement on track stretch makes it very difficult to throw a track when turning and slowing up at the same time.

In addition to the foregoing, the provision of a track section having a single bushed pin renders it practical to reduce the overall weight of the track, with the result that the vehicle may be operated at greater speeds with less fuel consumption, an important factor, especially in combat vehicles where remote supply depots are depended upon for fuel, and where speed is frequently a decided advantage.

It is still another object of this invention to further stiffen or reinforce the track sections by providing the load bearing blocks of the track sections with a grouser having end parts respectively extending along the connectors at opposite sides of the blocks. In some instances the end parts of the grousers may be formed integral with the sections of the grousers on the load bearing blocks, so that the grousers extend continuously from one side of the track sections to the other. Such a construction materially stiffens the fabricated track sections, and greatly improves traction.

The foregoing as well as other objects will be made more apparent as this description proceeds, especially when considered in connection with the accompanying drawings, wherein:

Figure 1 is a fragmentary elevational view of an endless track showing certain parts broken away for the sake of clearness;

Figure 2 is a sectional view taken on the line 2—2 of Figure 1;

Figure 3 is a cross sectional view taken on the line 3—3 of Figure 1;

Figure 4 is a cross sectional view taken on the line 4—4 of Figure 1;

Figure 5 is a fragmentary perspective view showing the rigid frame structure of one of the sections of the track shown in Figure 1;

Figure 6 is a cross sectional view taken on the line 6—6 of Figure 2;

Figure 7 is a sectional view taken on the line 7—7 of Figure 6;

Figure 8 is a side elevational view of a part of the track shown in Figure 1; and Figure 8A is a sectional view taken on the line 8A—8A of Figure 2.

Referring first to the embodiment of the invention shown in Figures 1 to 8A inclusive, the numeral 20 designates an endless track of the general type commonly used in connection with track laying vehicles, such for example, as combat tanks. The endless track selected for the purpose of illustration in Figures 1 to 8 inclusive of the drawings is of the double type, and comprises a plurality of pivotally connected sections indicated generally by the numeral 21. Each section has a rigid fabricated frame 22 shown best in Figure 5 of the drawings.

The frame 22 has laterally spaced substantially parallel pins 23 and 24 which are shown herein as being tubular in cross section. A pair of sleeves 25 and 26 are mounted on the pin 23 in spaced relationship axially of the pin, and are supported on the pin 23 through the medium of bushings 27 formed of a compressible material, such for example, as rubber. The bushings 27 may be bonded on the pin 23; and in any case, are held under radial compression between the pin 23 and the sleeves 25 and 26. Thus the bushings 27 permit limited deflection of the pin 23 relative to the sleeves, and also enable limited rotative movement of the sleeves relative to the pin 23. In the event it is desired to restrict radial deflection of the pin 23 relative to the sleeves 25 and 26, metal self-lubricating bushings 28 may be provided in addition to the flexible bushings 27. In this connection it will be noted that the outer ends of the sleeves 25 and 26 are enlarged somewhat to accommodate the bushings 28 and the wall thickness of the latter is predetermined to provide a limited clearance between the inner surfaces of the bushings 28, and the outer surface of the pin 23. Thus the metal bushings 28 do not interfere with the normal operation of the flexible bushings 27, but do limit the extent of the radial deflection of the latter bushings. The flexible bushings 27 at the outer ends of the metal bushings 28 serve to form a seal to prevent the entrance of foreign matter into the tubes and bearings.

The opposite ends of the pins 23 and 24 are respectively connected by members designated generally by the reference character 29. The members 29 have openings through one end for respectively receiving the outer ends of the sleeves 25 and 26. The other ends of the members 29 also have openings for respectively receiving opposite ends of the pin 24; and the latter is welded, brazed or otherwise permanently secured to the members 29. It will also be understood that the members 29 are welded or otherwise permanently fixed to the respective sleeves 25 and 26, so that the pin 24 pivots or swings about the pin 23. The adjacent ends of the sleeves 25 and 26 are respectively connected to the pin 24 by an intermediate connector 30 having laterally spaced links 31. Corresponding ends of the links 31 are respectively secured to adjacent ends of the sleeves 25 and 26, and the opposite ends of the links are secured to the pin 24.

Referring now to Figure 3 of the drawings, it will be noted that load bearing blocks 32 close the spaces defined by the connectors 29, 31 and the pin 24 and sleeves 25, 26. In the present instance the load bearing blocks 32 are formed of a cushioning moldable material such for example as rubber; and in practice, the rubber is molded around the pin 24 and sleeves 25, 26. In other words the portions of the pin 24 between the connectors and the sleeves 25, 26 are embedded in the rubber bearing blocks 32. The bearing blocks 32 are also molded with an outwardly extending projection 33, and these projections are arranged in the manner indicated in Figure 1 to provide a grouser for improving traction. In the present embodiment the grousers 33 also serve to stiffen or reinforce the respective track sections, particularly against bending at the middle of the track. For accomplishing this result a metal rib 34 is molded in the blocks 32 and extends along the projections 33 on the blocks. The rib 34 has a central portion 35 which bridges the links 31 of the connector 30 and is secured to the links 31. As shown in Figure 5 of the drawings, each link 31 has laterally spaced projections 36 between which the central portion 35 extends, and this central portion may be brazed or otherwise permanently secured to the projections 36. The opposite ends 37 of the grouser rib 34 extend across the end connecting members 29, and are permanently secured in grooves 38 formed in the members 29. In this connection attention is called to the fact that end connecting members 29 have laterally outwardly extending flanges 39, and these flanges are arranged to provide additional load bearing surfaces. In the present instance the ends 37 of the grouser rib 34 respectively project across the flanges 39 in order to provide maximum traction.

The opposite ends of the pins 23 and 24 respectively project laterally outwardly beyond the end connecting members 29 for pivotal connection with the pins of adjacent track sections. As shown in Figure 6 of the drawings, the pin 23 of one section 21 is connected to the pin 24 of an adjacent track section 21 by a connector 40. The connector 40 comprises a plate 41 and a fastener element 42. The plate 41 extends across the inner sides of the pins 23, 24 of adjacent track sections; and has the opposite ends curved as at 43 to provide bearings for the projecting ends of the aforesaid pins 23, 24. The fastener element 42 has a wedge-shaped head 44 located between the projecting ends of the pins 23, 24 of adjacent track sections and having the opposite sides respectively engaging flattened portions 45 on the projecting ends of the pins. In addition the fastener element 44 has a threaded shank 46 which projects inwardly through an opening in the plate 41 and is adapted to receive a nut 47. Thus the projecting ends of the pins of adjacent track sections are readily removably pivotally connected together at the extremities of the pins 23, 24.

The portions of the pins 23, 24 between the links 31 of each track section are respectively pivotally connected to the pins of adjacent track sections by an intermediate connector 48 shown in Figure 8A. The intermediate connector 48 comprises a block having inner and outer bearing sections 49 and 50. These sections bridge the pins 23, 24 of adjacent track sections and are secured in clamping engagement by a fastener element 51. Referring to Figure 2 of the drawings, it will be noted that each intermediate connector 48 has an outwardly extending part 52 which serves as a guide between the bogie wheels 53, shown by broken lines in Figure 2.

The teeth on the drive sprockets (not shown) successively engage in openings 54 at opposite sides of the track. As shown in Figures 1 and 5 of the drawings, the openings 54 are respectively formed in the end connecting members 29 of each section 21 between the pins 23 and 24. The arrangement is such that the teeth on the drive sprockets impart a driving thrust on the pins 24 when the tank or vehicle is moving in a forward direction, and this is desirable in that it assists materially in reducing track stretch because the pin 24 is supported at its extremities against bending.

Thus from the foregoing it will be seen that I have provided an endless track for track laying vehicles wherein each section of the track is composed of a fabricated frame having but a single bushed pin. Thus track stretch during use of the vehicle is reduced to a minimum, and the general construction of the track materially simplified. It will further be seen that although the track sections are of the fabricated type, nevertheless, provision is made for effectively stiffening or reinforcing the structure, and this also contributes materially to the stability of the track during use.

What I claim as my invention is:

1. A fabricated track section of single bushed type for a track laying vehicle, comprising a rigid frame having laterally spaced, substantially parallel first and second pins, a pair of sleeves supported for rotative movement on the first pin and spaced from each other axially thereof, flexible bushings of deformable material sleeved on the first pin within the respective sleeves and in radial compression between said pin and sleeves, end connector links on opposite sides of said section, said links having openings for the reception of sprocket teeth and being secured at an end of each to said second pin adjacent the opposite extremities of the latter, intermediate connector links disposed between said end connector links and secured at one end to said second pin, said end and intermediate links having the respective opposite ends thereto secured to the ends of said sleeves, load bearing blocks of resilient material extending between said respective end and intermediate links and securely bonded directly around said respective sleeves and second pins, a grouser member extending continuously from one end connector link to the other and across said intermediate links, said grouser member comprising a rigid stiffening rib having end portions rigidly secured to said end connector links in parallel spaced relation to and approximately directly over the axis of said second pin, an intermediate portion of said rib being rigidly secured to said intermediate links in parallel spaced relation to and approximately directly over said first pin, rigid end members to detachably connect the opposite ends of said first and second pins to the opposite ends of pins of adjacent similar track sections, and a rigid tire guide to detachably connect an intermediate portion of said second pin with a corresponding intermediate portion of the first pin of an adjacent similar track section.

2. A fabricated track section of single bushed type for a track laying vehicle, comprising a rigid frame having laterally spaced, substantially parallel first and second pins, a pair of sleeves supported for rotative movement on the first pin and spaced from each other axially thereof, flexible bushings of deformable material sleeved on the first pin within the respective sleeves and in radial compression between said pin and sleeves, end connector links on opposite sides of said section, said links having openings for the reception of sprocket teeth and being secured at an end of each to said second pin adjacent the opposite extremities of the latter, intermediate connector links disposed between said end connector links and secured at one end to said second pin, said end and intermediate links having the respective opposite ends thereto secured to the ends of said sleeves, load bearing blocks of resilient material extending between said respective end and intermediate links and securely bonded directly around said respective sleeves and second pins, a grouser member extending continuously from one end connector link to the other and across said intermediate links, said grouser member comprising a rigid stiffening rib having portions rigidly secured to said end and intermediate connector links, rigid members to detachably connect the opposite ends of said first and second pins to the opposite ends of pins of adjacent similar track sections, and a rigid tire guide to detachably connect an intermeidate portion of said second pin with a corresponding intermediate portion of the first pin of an adjacent similar track section.

3. A fabricated track section of single bushed type for a track laying vehicle, comprising a rigid frame having laterally spaced, substantially parallel first and second pins, a pair of sleeves supported for rotative movement on the first pin and spaced from each other axially thereof, flexible bushings of deformable material sleeved on the first pin within the respective sleeves and in radial compression between said pin and sleeves, end connector links on opposite sides of said section, said links having openings for the reception of sprocket teeth and being secured at an end of each to said second pin adjacent the opposite extremities of the latter, intermediate connector links disposed between said end connector links and secured at one end to said second pin, said end and intermediate links having the respective opposite ends thereto secured to the ends of said sleeves, load bearing blocks of resilient material extending between said respective end and intermediate links and securely bonded directly around said respective sleeves and second pins, a grouser member extending continuously from one end connector link to the other and across said intermediate links, said grouser member comprising a rigid stiffening rib having end portions rigidly secured to said end connector links in parallel spaced relation to and approximately directly over the axis of said second pin, an intermediate portion of said rib being rigidly secured to said intermediate links in parallel spaced relation to and approximately directly over said first pin, said end connector links having integral outward flanges at their sides across which said rib end portions extend, said end portions being rigidly secured to said flanges, rigid end members to detachably connect the opposite ends of said first and second pins to the opposite ends of pins of adjacent similar track sections, and a rigid tire guide to detachably connect an intermediate portion of said second pin with a corresponding intermediate portion of the first pin of an adjacent similar track section.

4. A fabricated track section of single bushed type for a track laying vehicle, comprising a rigid frame having laterally spaced, substantially parallel first and second pins, a pair of sleeves supported for rotative movement on the first pin and spaced from each other axially thereof, flexible bushings of deformable material sleeved on the first pin within the respective sleeves and in radial compression between said pin and sleeves, end connector links on opposite sides of said section, said links having openings for the reception of sprocket teeth and being secured at an end of each to said second pin adjacent the opposite extremities of the latter, intermediate connector links disposed between said end connector links and secured at one end to said second pin, said end and intermediate links having the respective opposite ends thereto secured to the ends of said sleeves, load bearing blocks of resilient material extending between said respective end and intermediate links and securely bonded directly around said respective sleeves and second pins, a grouser member extending continuously from one end connector link to the other and across said intermediate links, said grouser member comprising a rigid stiffening rib having end portions rigidly secured to said end connector links in parallel spaced relation to and approximately directly over the axis of said second pin, an intermediate portion of said rib being rigidly secured to said intermediate links in parallel spaced relation to and approximately directly over said first pin, said end connector links having integral outward flanges at their sides across which said rib end portions extend, said end portions being rigidly secured to said flanges, said grouser rib projecting above the surface of said load bearing blocks and having resilient material bonded to at least one side of the thus projecting sides thereof, rigid end members to detachably connect the opposite ends of said first and second pins to the opposite ends of pins of adjacent similar track sections, and a rigid tire guide to detachably connect an intermediate portion of said second pin with a corresponding intermediate portion of the first pin of an adjacent similar track section.

5. A fabricated track section of single bushed type for a track laying vehicle, comprising a rigid frame having laterally spaced, substantially parallel first and second pins, a pair of sleeves supported for rotative movement on the first pin and spaced from each other axially thereof, flexible bushings of deformable material sleeved on the first pin within the respective sleeves and in radial compression between said pin and sleeves, end connector links on opposite sides of said section, said links each having an opening for the reception of sprocket teeth and being secured at an end thereof to said second pin adjacent an extremity of the latter, intermediate connector links disposed between said end connector links secured at an end to said second pin, said end and intermediate links having the respective opposite ends thereof secured to the ends of said sleeves, load bearing blocks of resilient material extending between said end and intermediate links and securely bonded directly around said respective sleeves and second pins, and a grouser member extending continuously from one end connector link to the other and across said intermediate links, said grouser member comprising a rigid stiffening rib having portions rigidly secured to said end and intermediate connector links.

6. A fabricated track section of single bushed type for a track laying vehicle, comprising a rigid frame having laterally spaced, substantially parallel first and second pins, a pair of sleeves supported for rotative movement on the first pin and spaced from each other axially thereof, flexible bushings of deformable material sleeved on the first pin within the respective sleeves and in radial compression between said pin and sleeves, end connector links on opposite sides of said section, said links each having an opening for the reception of sprocket teeth and being secured at an end thereof to said second pin adjacent an extremity of the latter, intermediate connector links disposed between said end connector links secured at an end to said second pin, said end and intermediate links having the respective opposite ends thereof secured to the ends of said sleeves, load bearing blocks of resilient material extending between said end and intermediate links and securely bonded directly around said respective sleeves and second pins, and a grouser member extending continuously from one end connector link to the other and across said intermediate links, said grouser member comprising a rigid stiffening rib having end portions rigidly secured to said end connector links in parallel spaced relation to and approximately directly over said second pin, an intermediate portion of said rib being rigidly secured to said intermediate links in parallel spaced relation to and approximately directly over said first pin.

References Cited in the file of this patent

UNITED STATES PATENTS

| | | |
|---|---|---|
| 1,973,214 | Lamb | Sept. 11, 1934 |
| 2,129,696 | Knox | Sept. 13, 1938 |
| 2,375,170 | McNeil | May 1, 1945 |
| 2,389,438 | Knox | Nov. 20, 1945 |
| 2,409,502 | Leguillon et al. | Oct. 15, 1946 |
| 2,422,483 | Haushalter | June 17, 1947 |
| 2,430,573 | Krotz | Nov. 11, 1947 |

FOREIGN PATENTS

| | | |
|---|---|---|
| 537,995 | Great Britain | July 16, 1941 |